United States Patent [19]

Wirth

[11] 4,375,612
[45] Mar. 1, 1983

[54] CONTROLLED REGENERATIVE D-C POWER SUPPLY

[75] Inventor: William F. Wirth, Slidell, La.

[73] Assignee: Borg-Warner Corporation, Chicago, Ill.

[21] Appl. No.: 270,740

[22] Filed: Jun. 5, 1981

Related U.S. Application Data

[63] Continuation-in-part of Ser. No. 75,306, Sep. 12, 1979, abandoned.

[51] Int. Cl.³ .............................................. H02P 7/44
[52] U.S. Cl. .................................. 318/767; 318/803; 363/37; 363/48; 363/87; 363/129
[58] Field of Search .................. 363/34–38, 363/47, 48, 85, 87, 128, 129; 318/803, 805, 808, 722, 723, 762, 810, 811, 812, 767, 768

[56] References Cited

U.S. PATENT DOCUMENTS 4,139,885  2/1979  Overzet et al. ................. 363/37

FOREIGN PATENT DOCUMENTS 2513519  9/1976  Fed. Rep. of Germany ...... 318/812
52-47704  4/1977  Japan ............................... 363/37
476643  11/1975  U.S.S.R. ........................... 363/34

*Primary Examiner*—William H. Beha, Jr.
*Attorney, Agent, or Firm*—James E. Tracy

[57] ABSTRACT

A-C energy, from an a-c power system, is converted by a phase-controlled SCR rectifier bridge, which is followed by a series-connected filter choke and a shunt-connected filter capacitor, to d-c power for delivery via a d-c bus to a load, such as an inverter and an a-c induction motor driven by the inverter. When there is a decrease in load demand, for example when the motor speed is to be reduced, fast speed control is obtained by regenerating power back into the a-c power system from the load. Power flow through the d-c power supply is reversed by means of a switching network, interposed between the filter choke and capacitor, having a pair of reverse SCR's for cross-coupling the positive and negative lines of the d-c bus. When the reverse SCR's are fired into conduction, the connections between the filter capacitor and the bridge's output terminals are effectively reversed, thereby facilitating power flow from the load to the a-c power system.

6 Claims, 2 Drawing Figures

CONTROLLED REGENERATIVE D-C POWER SUPPLY

CROSS-REFERENCE TO RELATED APPLICATION

This is a continuation-in-part application of application Ser. No. 75,306, filed Sept. 12, 1979, now abandoned.

BACKGROUND OF THE INVENTION

This invention relates to a controlled regenerative d-c power source which produces, from applied a-c power, d-c power for driving a load, the source being capable of returning, to the a-c power system, power which is generated in the load.

In a well-known prior regenerative d-c power supply, a phase-controlled SCR rectifier bridge, having a network of forward SCR's, rectifies applied a-c voltage from an a-c power system (either single-phase or three-phase) to develop a d-c voltage for energizing a load. Six forward SCR's are needed for three-phase, and four for single-phase. Normally, controlled power must be supplied to the load and this is accomplished by regulating the conduction angles of the forward SCR's during each half cycle of the applied a-c voltage. Each forward SCR can conduct, during each positive polarity half cycle of the voltage applied thereto from the a-c power system, when the SCR's anode is positive relative to its cathode. However, conduction will not occur during a positive half cycle until gate current is supplied to the SCR's gate. At that instant, the SCR fires into conduction, or turns on, and permits load current to flow therethrough until the end of the positive half cycle. The greater the phase angle or time delay between the start of a positive half cycle and the firing of the SCR into conduction, the less the conduction angle and the less alternating current that will be rectified and supplied to the load, thereby providing less d-c voltage across the output of the SCR rectifier bridge.

To achieve regeneration of power from the load and back into the a-c power system, each of the forward SCR's is shunted by a corresponding and oppositely poled reverse SCR, thereby requiring a total of twelve SCR's for three-phase and eight for single-phase. Reversing the power flow so that power will be translated from the load to the a-c power system is desirable in many applications where the load demand changes. For example, when the SCR rectifier bridge powers an inverter which in turn produces a-c voltage for driving, and controlling the speed of, an a-c induction motor, speed control is enhanced when it is possible to send power, generated in the load, back into the a-c power system. To explain, when the motor runs at a constant speed or the speed is increased, the load demand normally requires that power flow from the a-c power system to the inverter and motor. On the other hand, when the load requirements drop and it is necessary to decrease the motor speed in a relatively short time, such fast speed reduction cannot be accomplished unless the power flow can be reversed. This is necessary since the running motor acts as a generator, generating a counter electromotive force or counter EMF. Power must flow away from the motor to achieve fast speed reduction. In the prior regenerative d-c power supply, discussed above, when it is desired to reverse the power flow, the forward SCR's are turned off and the conduction angles of the reverse SCR's are controlled.

Unfortunately, a forward SCR and a series-connected similarly poled reverse SCR will always be across the two incoming power lines in the single-phase application and always across each pair of the three power lines in the three-phase environment. As a consequence, when a fault develops and those two SCR's are both in the conducting state at the same time, and when their anodes are positive relative to their cathodes, a line-to-line short circuit will be created and very high magnitude fault current will flow from the power system and through the SCR's. Of course, under normal conditions a forward SCR and a reverse SCR are never conductive simultaneously. However, an SCR may be inadvertently fired into conduction. For example, it can be triggered by noise. Since the forward and reverse SCR's can establish unwanted line-to-line short circuits, they must be capable of handling the resulting very high magnitude fault current without suffering permanent damage. Hence, the SCR's must be sized accordingly.

The controlled regenerative d-c power supply of the present invention constitutes a significant improvement over those previously developed, especially over the prior arrangement described hereinbefore, being considerably simpler and less expensive in construction and requiring several fewer components. Moreover, any fault currents are of much lower amplitude, thereby avoiding the oversizing of circuit element which is necessary in the prior arrangement.

SUMMARY OF THE INVENTION

The controlled regenerative d-c power supply of the invention converts a-c energy, received from an a-c power system, to d-c power for delivery to a load, where at times power generated in the load flows in the reverse direction from the load and through the d-c power supply back to the a-c power system. The d-c power supply comprises a phase-controlled rectifier bridge, having positive and negative output terminals, for changing a-c energy from the a-c power system to d-c power for translation to the load. A filter circuit, which includes a series-connected filter choke and a shunt-connected filter capacitor, is coupled between the bridge and the load to provide filtered d-c voltage for the load. A switching network, interposed in the filter circuit between the choke and the capacitor, is provided to effect a reversal of the connections between the capacitor and the output terminals of the bridge to facilitate regeneration of power from the load and back into the a-c power system. Control means are included for controlling the switching network to regulate the reverse power flow from the load to the a-c power system.

DESCRIPTION OF THE DRAWINGS

The features of the invention which are believed to be novel are set forth with particularity in the appended claims. The invention, together with further advantages and features thereof, may best be understood, however, by reference to the following description in conjunction with the accompanying drawings in which:

DESCRIPTION OF THE ILLUSTRATED EMBODIMENT

Figure 1:
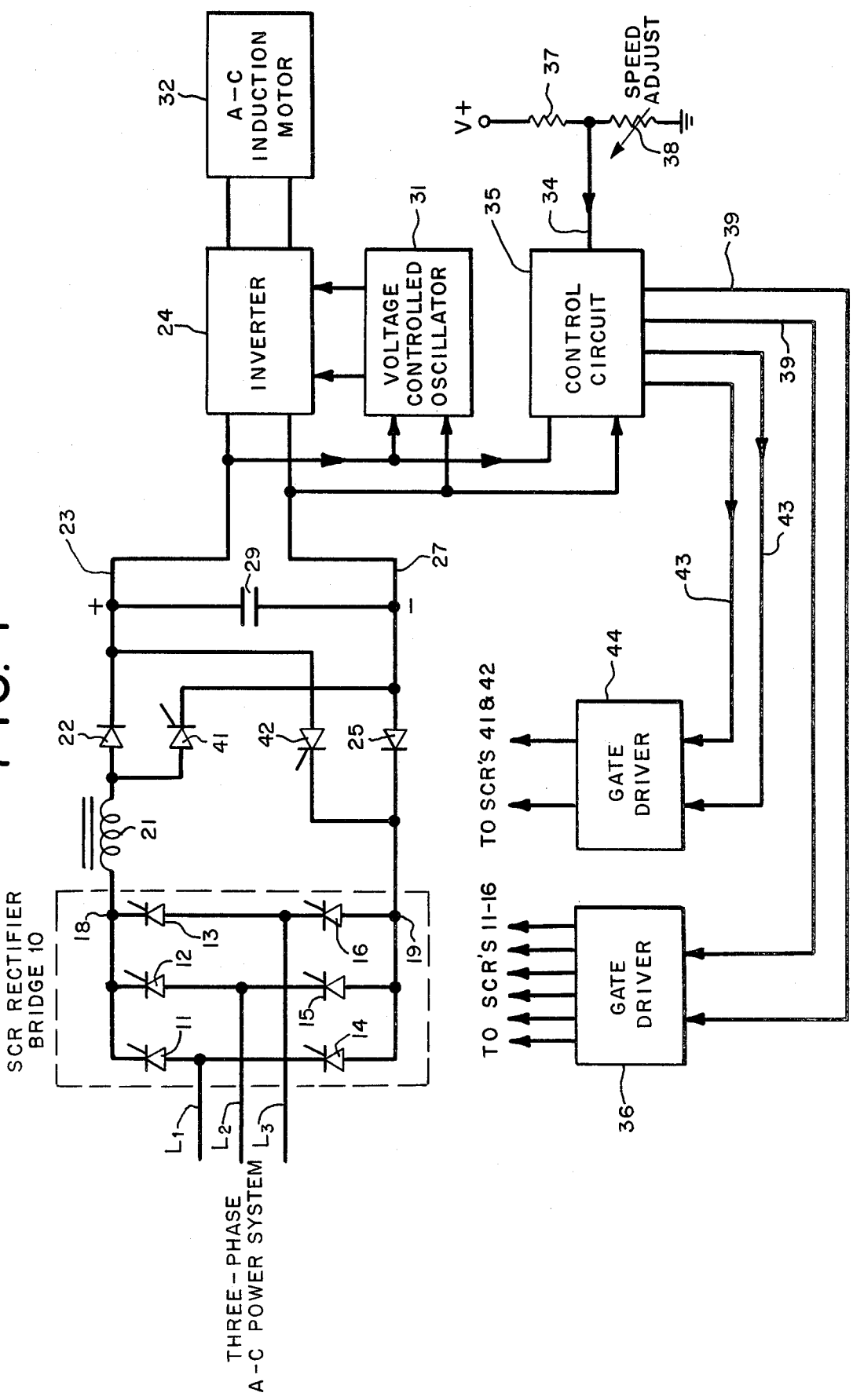
FIG. 1 schematically illustrates a controlled regenerative d-c power supply, constructed in accordance with the present invention, and the manner in which that d-c power supply may energize an inverter-driven inducation motor.

Line conductors $L_1$, $L_2$ and $L_3$ connect to a conventional three-phase a-c power system and thus provide three-phase a-c voltage, namely three alternating voltages that are phase-displaced with respect to each other by 120° and have a commutating frequency of 60 hertz. Each of the three phase voltages is a line-to-line voltage and appears on one of the line conductors $L_1$, $L_2$ and $L_3$ relative to another one of the line conductors. The amplitude of each phase voltage may take any appropriate value depending on the characteristics of the load to be energized. The a-c energy received over the line conductors is converted to d-c power by SCR rectifier bridge 10 which is of well-known construction. Specifically, the bridge has a family of six silicon controlled rectifiers or SCR's 11–16 which, when fired into conduction, rectify the applied a-c voltage and develop across the bridge's positive and negative output terminals (designated 18 and 19, respectively) rectified voltage of a magnitude determined by the conduction angles of the SCR's. Of course, this rectified voltage will be of positive polarity at terminal 18 with respect to terminal 19. As will be made apparent, SCR's 11–16 regulate the power flow to the load when power is needed in the load. Hence, they may appropriately be called "forward SCR's".

Series-connected filter choke 21, diode 22 and positive line 23 couple positive output terminal 18 to the load (namely to one input of inverter 24) while series-connected diode 25 and negative line 27 couple negative output terminal 19 to the load, namely to the other input of the inverter. Filter capacitor 29 is connected between lines 23 and 27 and thus in shunt with the load. Lines 23 and 27 therefore provide a d-c bus for conveying d-c voltage from bridge 10 and filter circuit 21, 29 to inverter 24. Diodes 22 and 25 are poled to permit normal current flow when power is supplied to inverter 24. Current will also flow from terminal 18 and through the conduction path comprising choke 21, diode 22, capacitor 29 and diode 25 to terminal 19, developing across capacitor 19 filtered d-c voltage (namely, low ripple component) of a magnitude directly proportional to the magnitude of the rectified voltage across terminals 18 and 19. Thus, the d-c voltage applied over the d-c bus (lines 23 and 27) to inverter 24 will depend on the conduction angles of the forward SCR's 11–16.

Inverter 24 responds to the d-c bus voltage and produces therefrom an a-c voltage of a magnitude directly proportional to the amplitude of the d-c voltage. The frequency of the inverter output voltage is established by the pulse repetition frequency of the timing or gating pulses received from voltage controlled oscillator 31, which in turn operates in response to the d-c bus voltage across lines 23 and 27. The frequency of the oscillator is determined by the d-c bus voltage and varies directly therewith, thereby maintaining substantially constant the ratio of amplitude to frequency of the a-c voltage developed by inverter 24. The output of the inverter couples to a-c induction motor 32 and effects rotation thereof at a speed determined by and directly proportional to the inverter frequency. Although not shown, the shaft of motor 32 will drive some mechanical load. By maintaining a fixed ratio of the amplitude of the inverter output voltage relative to its frequency, motor 32 will have a constant torque output capability regardless of motor speed.

To adjust the motor speed, the operation of forward SCR's 11–16 may be automatically controlled in well-known manner by control circuit 35 and gate driver 36 to establish the d-c bus voltage, produced across filter capacitor 29, at a selected desired amplitude level to regulate the current flow, and consequently the power flow, to inverter 24 and motor 32. To elucidate, the d-c voltage, which is applied to inverter 24 and determines the motor speed, is also applied to control circuit 35 which compares that voltage with a reference d-c voltage received over line 34 from the junction of fixed resistor 37 and adjustable (speed adjust) resistor 38. From the comparison, an error signal will be produced (on lines 39) which varies as a function of the difference between the desired d-c magnitude (represented by the reference voltage from voltage divider 37, 38) and the actual magnitude of the d-c bus voltage being fed to the inverter. In well-known fashion, gate driver 36 responds to that error signal to produce properly timed gate current pulses for application to the gates of SCR's 11–16 in order to control the conduction angles as required to establish the d-c bus voltage at the magnitude necessary to drive motor 32 at the speed determined by the setting of speed adjust resistor 38. If the d-c magnitude tends to decrease from the required level (thereby tending to decrease the motor speed), the error signal changes and causes gate driver 36 to increase the conduction angles, thereby increasing the d-c bus voltage across lines 23 and 27 until the correct amplitude level is re-established. Assuming that a higher motor speed is preferred, speed adjust resistor 38 will be adjusted so that the error signal will cause gate driver 36 to increase the conduction angles of SCR's 11–16 sufficiently to bring the d-c bus voltage applied to the inverter up to the level necessary to drive motor 32 at the new desired speed.

Of course, while the motor speed may be changed by manually adjusting the speed adjust resistor 38, the reference voltage applied to control circuit 35 over line 34 may be derived by sensing some parameter or characteristic of the system, in which the controlled regenerative d-c power supply is incorporated, in order to automatically control the motor speed in response to that sensed information.

It is also to be recognized that the d-c power supply may operate in response to single-phase rather than three-phase a-c energy. In the single-phase environment, line conductor $L_3$ and forward SCR's 13 and 16 would be omitted. A rectified voltage of positive polarity would still be produced at terminal 18 with respect to terminal 19.

Turning now to the invention, relatively fast control of the load (namely, the motor speed in the illustrated embodiment) requires that the d-c power supply be effectively bidirectional with respect to the power flow, permitting power which is generated in the load to be translated back into the a-c power system as well as permitting normal flow of power into the load. Reverse power flow is especially needed when the information sent to control circuit 35 calls for a rapid speed reduction. Under those conditions, bridge 10, under the control of gate driver 36, begins to reduce the d-c voltage across its terminals 18 and 19. However, at this time motor 32 will function as a generator and this will delay the reduction of the motor speed unless the power generated in the load is able to flow back into the a-c power system.

The desired reverse power flow is facilitated in the illustrated embodiment by interposing a switching network (reverse SCR's 41 and 42 and diodes 22 and 25) in the filter circuit between filter choke 21 and filter capacitor 29. In effect, SCR 41 serves as a solid state switch for cross-coupling the positive line 23 to the negative line 27, and SCR 42 performs as a solid state switch for cross-coupling line 27 to line 23. When the reverse SCR's 41 and 42 are rendered conductive, the connections between capacitor 29 and the output terminals 18 and 19 of bridge 10 will effectively be reversed, positive line 23 being connected to negative terminal 19 and negative line 27 being connected to positive terminal 18. In other words, the connections from the d-c bus to bridge 10 will be reversed. If SCR's 41 and 42 are fired into conduction when it is desired to lower the motor speed, the d-c voltage across terminals 18 and 19 will be less than that across capacitor 29 (namely, across the d-c bus) and current will flow from the load and through positive line 23, reverse SCR 42, at least one of forward SCR's 14-16 and into the power system. The return path for the current will include at least one of forward SCR's 11-13, choke 21, reverse SCR 41 and negative line 27. Anytime the output voltage of bridge 10 is less than the d-c bus voltage across capacitor 29, and SCR's 41 and 42 are in a conducting state, power will flow from the load and into the three-phase a-c power system to quickly equalize the d-c bus voltage and the bridge voltage. Thus, as the bridge output voltage is decreased, the d-c bus voltage will do likewise.

Control of reverse SCR's 41 and 42, and hence control of the switching network, is achieved by control circuitry well understood in the art. The same controlling system used in the previously developed regenerative d-c power supply, discussed hereinbefore, may be employed to regulate the operation of SCR's 41 and 42. This is illustrated in the drawing by control circuit 35 and gate driver 44. In well-known fashion, control circuit 35 compares the actual d-c bus voltage with the desired d-c voltage (represented by the d-c reference voltage on line 34) and determines whether power should flow from the power system to the load or vice-versa. Under normal conditions when power is needed by the load, gate driver 44 is effectively turned off (SCR's 41 and 42 thereby remaining in their non-conductive states) while gate driver 36 will be controlled to supply gate current to SCR's 11-16 in the manner previously described. On the other hand, if control circuit 35 determines that the d-c bus voltage is higher than it should be and that power should flow away from the load and into the a-c power system in order to lower the d-c bus voltage, gate driver 44 is controlled over lines 43 to supply properly timed gate current pulses to the gates of reverse SCR's 41 and 42, causing them to conduct to provide a controlled power transfer from the load to the power supply. Gate driver 36, under the control of control circuit 35, will turn on SCR's 11-16 at the correct times to enable the power to flow through rectifier 10 in the reverse direction.

Figure 2:
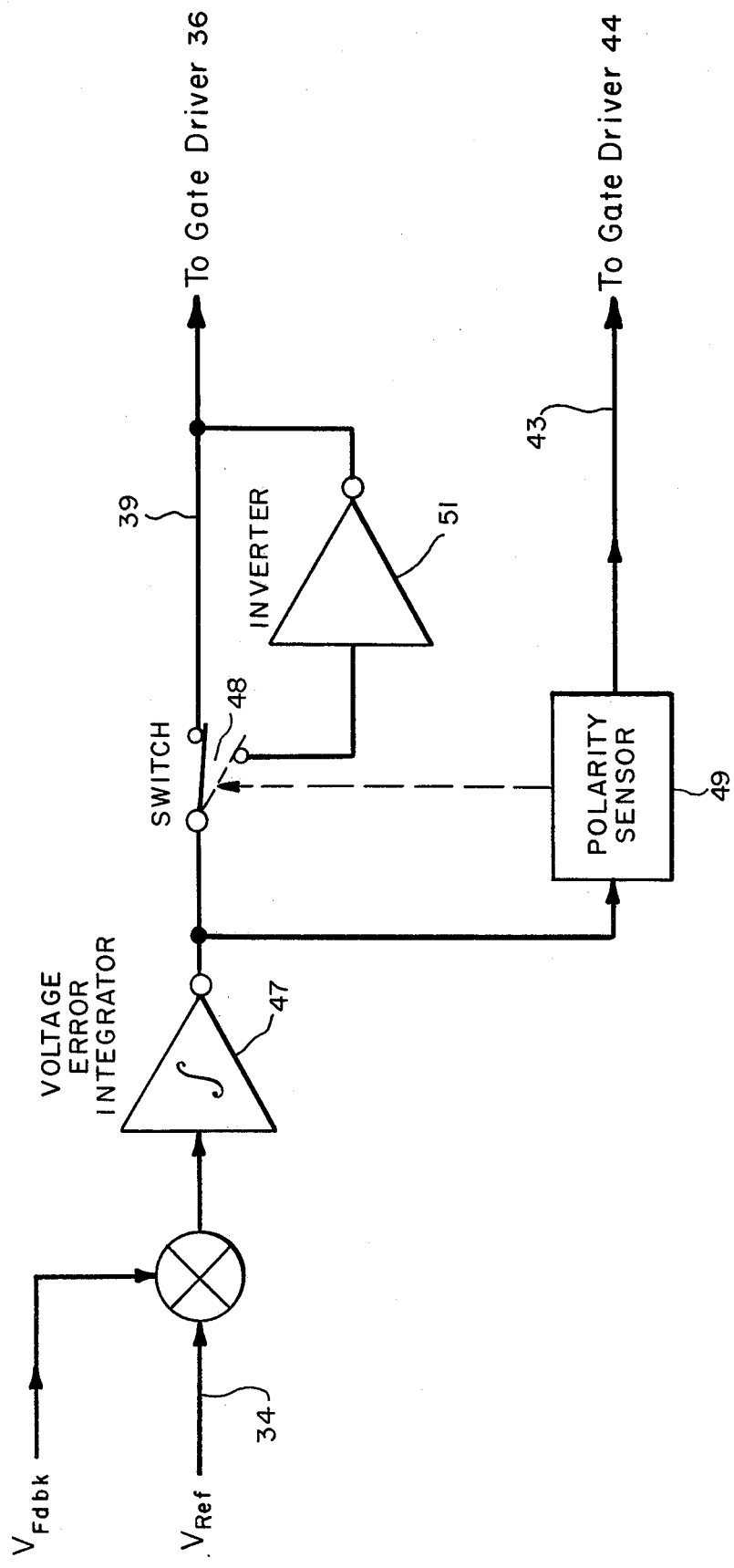
FIG. 2 is a more detailed schematic representation of a portion of FIG. 1.

One particular form that control circuit 35 may take is schematically illustrated in FIG. 2. The voltage signal labelled "$V_{Fdbk}$" is the feedback signal from the d-c bus and is proportional to (specifically scaled down from) the d-c bus voltage. For example, the feedback voltage may be a 100 to one reduction of the actual bus voltage. The voltage signal $V_{Ref}$ is the speed adjust or voltage command signal received over line 34 from voltage divider 37, 38. Voltage error integrator 47 is an operational amplifier (op amp) which integrates the difference between $V_{Ref}$ and $V_{Fdbk}$. When $V_{Ref}$ is larger than $V_{Fdbk}$ which would occur when a higher speed and higher bus voltage are desired, the output of the voltage error integrator is positive and increasing, calling for more power to flow to the load and for more current to charge the filter capacitor 29. The voltage signal produced by integrator 47 is the error signal and is proportional to the phase angle at which the six SCR's 11-16 need to be turned on. This positive voltage error signal is applied through electronic switch 48 to gate driver 36 which effectively converts the signal to gating pulses for SCR's 11-16, as a result of which the desired higher speed and higher bus voltage will be achieved and will be maintainted. During this time the system will be operating in its forward power flow mode. Gate driver 36 may specifically be a PHASE CONTROL GATE DRIVER, Model 31Y294B, manufactured by Vectrol, Inc., Rockville, Md.

Assume now that a reduced speed is desired. The voltage command signal $V_{Ref}$ will thus be decreased. Since the new $V_{Ref}$ will be lower than $V_{Fdbk}$, the output of integrator 47 will go from positive through zero to negative, calling for reverse power flow, namely for power to flow from the load and for current to be removed from capacitor 29. Polarity sensor 49 responds to the negative polarity output of integrator 47 and operates switch 48 to couple the voltage error integrator 47 to inverter 51. The negative polarity output of integrator 47 is thus inverted so a positive error voltage will be applied to gate driver 36, thereby applying gating pulses to SCR's 11-16. Meanwhile polarity sensor 49, in response to the negative output of integrator 47, produces a positive voltage signal for turning on gate driver 44, which thereupon applies gating pulses to SCR's 41 and 42 to turn those SCR's on. Gate driver 44 may take the same form as gate driver 36. The voltage signal applied to gate driver 44 from polarity sensor 49 is either zero (SCR's 41 and 42 thereby being off) or positive at a fixed level (SCR's 41 and 42 thereby being on). In contrast, the positive error voltage applied to gate driver 36 may vary anywhere between zero and a fixed level.

As the output of integrator 47 becomes more negative during the reverse power flow mode, the output of inverter 51 increases in a positive direction and SCR's 11-16 will continue to remove current from capacitor 29 (thereby dropping the d-c bus voltage) through the conducting SCR's 41 and 42. As the bus voltage continues to decrease, $V_{Fdbk}$ will drop below $V_{Ref}$ whereupon the output of integrator 47 will go positive. When this condition is sensed by the polarity sensor 49, switch 48 is operated to render inverter 51 inoperative and to supply the positive error voltage from integrator 47 directly to gate driver 36. At the same time, the output of sensor 49 drops to zero which causes SCR's 41 and 42 to turn off. Hence, the system returns to its forward power flow operating mode.

It will thus be appreciated that the reverse power flow capability is achieved by means of only two diodes (22 and 25) and two SCR's (41 and 42) and the gating circuitry for the SCR's. In sharp contrast, in the prior art arrangement discussed hereinbefore, when three-phase power is involved a total of six reverse SCR's and their gate driving circuits are needed. Obviously, the arrangement of the present invention is significantly simpler in construction and of lower cost than that of the prior art.

Additional cost savings are realized since the SCR's need not be oversized, as in the prior system, in order to handle high magnitude fault current. In the event that a reverse SCR is inadvertently triggered into conduction (such as by noise) when a particular pair of forward SCR's are in their conductive states, a line-to-line short will not be created (as in the prior arrangement) and any resulting fault current will be of substantially lower magnitude. This advantage is obtained by placing the switching network (diodes 22 and 25 and reverse SCR's 41 and 42) between filter choke 21 and filter capacitor 29, thereby requiring all fault currents to pass through the filter choke. To explain, assume, for example, that SCR's 11, 15 and 41 are all conductive during a half cycle when the instantaneous voltage on line conductor $L_1$ is positive with reference to the instantaneous voltage on line conductor $L_2$. Fault current will therefore flow at that time from line conductor $L_1$ and through SCR 11, filter choke 21, SCR 41, diode 25 and SCR 15 to line conductor $L_2$. However, since the fault current flows through choke 21, which has a substantial impedance, its amplitude will be significantly reduced. Since all of the circuit components need handle only relatively low magnitude fault currents, they may be sized accordingly.

While a particular embodiment of the invention has been shown and described, modifications may be made, and it is intended in the appended claims to cover all such modifications as may fall within the true spirit and scope of the invention.

I claim:

1. A controlled regenerative d-c power supply for converting a-c energy, received from an a-c power system, to d-c power for delivery to a load, where at times power flows in the reverse direction from the load and through the d-c power supply back to the a-c power system, comprising:
    a phase-controlled rectifier bridge, having positive and negative output terminals, for changing a-c energy from the a-c power system to d-c power for translation to the load;
    a filter circuit, including a series-connected filter choke and a shunt-connected capacitor, coupled between said bridge and the load to provide filtered d-c voltage for the load;
    a switching network, interposed in said filter circuit between said choke and said capacitor, for effectively reversing the connections between said capacitor and the output terminals of said bridge to facilitate regeneration of power from the load and back into the a-c power system;
    and control means for controlling said switching network to regulate the reverse power flow from the load to the a-c power system.

2. A controlled regenerative d-c power supply according to claim 1 wherein a positive line couples said positive output terminal to said load and a negative line couples said negative output terminal to said load, wherein said filter choke and a first diode are connected in series with said positive line and a second diode is connected in series with said negative line, said first and second diodes being poled to conduct when power flows to the load, wherein said filter capacitor is connected between said positive and negative lines, wherein said switching network includes a first solid state switch for cross-coupling said positive line to said negative line and a second solid state switch for cross-coupling said negative line to said positive line, and wherein said control means renders said solid state switches conductive for connecting said positive line to said negative output terminal of said bridge and for connecting said negative line to said positive output terminal of said bridge, thereby permitting power to flow from the load to the a-c power system.

3. A controlled regenerative d-c power supply according to claim 2 wherein said first solid state switch is a first SCR having its anode connected to the anode of said first diode and its cathode connected to the anode of said second diode, wherein said second solid state switch is a second SCR having its anode connected to the cathode of said first diode and its cathode connected to the cathode of said second diode, and wherein said control means controls the conduction angles of said first and second SCR's.

4. A controlled regenerative d-c power supply according to claim 1 wherein the load includes an inverter and an a-c induction motor which is driven by the inverter.

5. A controlled regenerative d-c power supply according to claim 1 wherein the a-c power system is a three-phase a-c power system.

6. A controlled regenerative d-c power supply for converting a-c energy, received from an a-c power system, to d-c power for delivery to a load, where at times power generated in the load flows in the reverse direction from the load and through the d-c power supply back to the a-c power system, comprising:
    a phase-controlled SCR rectifier bridge having a plurality of forward SCR's for rectifying applied a-c voltage, from the a-c power system, to develop across the bridge's positive and negative output terminals rectified voltage of a magnitude determined by the conduction angles of the forward SCR's;
    a conduction path connected from said positive output terminal to said negative output terminal and including, in series and in the order named, a filter choke, a first diode, a filter capacitor and a second diode, said diodes being poled to permit current flow through the conduction path in the direction from said positive output terminal to said negative output terminal; P1 means, including a d-c bus, for coupling the load in shunt with said filter capacitor;
    means for controlling the conduction angles of said forward SCR's to control the current flow through said conduction path, thereby developing a filtered d-c voltage of desired amplitude across said filter capacitor, and to control the current flow to the load from the a-c power system, thereby regulating the power flow to the load;
    a first reverse SCR having its anode connected to the junction of said filter choke and said first diode and its cathode connected to the junction of said filter capacitor and said second diode;
    a second reverse SCR having its anode connected to the junction of said first diode and said filter capacitor and its cathode connected to said negative output terminal of said bridge;
    and control means for controlling the conduction angles of said first and second reverse SCR's to effectively reverse the connections of said filter capacitor to said positive and negative output terminals, thereby facilitating current flow, and power flow, from the load into the a-c power system.

* * * * *

UNITED STATES PATENT AND TRADEMARK OFFICE
CERTIFICATE OF CORRECTION

PATENT NO. : 4,375,612
DATED : March 1, 1983
INVENTOR(S) : William Frederick Wirth It is certified that error appears in the above—identified patent and that said Letters Patent is hereby corrected as shown below:

Column 8, line 45, after "output terminal;" cancel -- P1 --.

Signed and Sealed this

Tenth Day of May 1983

[SEAL]

Attest:

Attesting Officer

GERALD J. MOSSINGHOFF
Commissioner of Patents and Trademarks